United States Patent
Isaacs et al.

(10) Patent No.: US 7,996,527 B2
(45) Date of Patent: *Aug. 9, 2011

(54) SYSTEM, METHOD AND APPARATUS FOR PLAYING A SOUND IDENTIFIER BASED ON CONNECTION STATUS

(75) Inventors: Ellen Isaacs, Belmont, CA (US); Dipti Ranganathan, Dallas, TX (US); Alan Walendowski, Belmont, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/503,355

(22) Filed: Jul. 15, 2009

(65) Prior Publication Data

US 2010/0023590 A1    Jan. 28, 2010

Related U.S. Application Data

(60) Continuation of application No. 11/258,337, filed on Oct. 25, 2005, now Pat. No. 7,584,257, which is a division of application No. 09/823,167, filed on Mar. 30, 2001, now Pat. No. 7,043,530, and a continuation-in-part of application No. 09/609,893, filed on Jul. 5, 2000, now Pat. No. 6,760,754.

(60) Provisional application No. 60/264,421, filed on Jan. 26, 2001, provisional application No. 60/260,035, filed on Jan. 5, 2001, provisional application No. 60/184,180, filed on Feb. 22, 2000.

(51) Int. Cl.
  *G06F 15/173* (2006.01)
(52) U.S. Cl. .... 709/224; 709/204; 709/206; 379/373.01
(58) Field of Classification Search .................. 709/204, 709/206, 224, 227; 715/753; 379/88.01, 379/373.01, 373.02
See application file for complete search history.

(56) References Cited

U.S. PATENT DOCUMENTS

| | | | | |
|---|---|---|---|---|
| 5,784,568 A | * | 7/1998 | Needham | 715/753 |
| 6,148,328 A | * | 11/2000 | Cuomo et al. | 709/204 |
| 6,564,261 B1 | * | 5/2003 | Gudjonsson et al. | 709/227 |
| 6,570,983 B1 | * | 5/2003 | Speeney et al. | 379/373.02 |
| 6,668,173 B2 | * | 12/2003 | Greene | 709/201 |
| 6,750,881 B1 | * | 6/2004 | Appelman | 715/733 |
| 7,426,269 B2 | * | 9/2008 | Heimbecher | 379/373.01 |
| 7,584,257 B2 | * | 9/2009 | Isaacs et al. | 709/206 |
| 7,672,439 B2 | * | 3/2010 | Appelman et al. | 379/374.01 |

* cited by examiner

*Primary Examiner* — Ramy Osman

(57) ABSTRACT

A system, method and apparatus for facilitating communication among a number of distributed clients in a distributed network is disclosed. A user, such as through a personal digital assistant device, may select one or more instant messages for transmission to one or more other users in the network. The instant messages may be sound instant message and/or text instant messages. During messaging, message status indicators provide users with the status of their respective messages. In one embodiment, the messages may be deemed to be either pending or received as distinguished by a pending status indicator and a received status indicator.

17 Claims, 7 Drawing Sheets

SYSTEM, METHOD AND APPARATUS FOR PLAYING A SOUND IDENTIFIER BASED ON CONNECTION STATUS

This application is a continuation of Ser. No. 11/258,337 filed Oct. 25, 2005, now U.S. Pat. No. 7,584,257, which is a divisional application of U.S. patent application Ser. No. 09/823,167, filed Mar. 30, 2001, now U.S. Pat. No. 7,043,530, which claims the benefit of U.S. provisional application No. 60/260,035, filed Jan. 5, 2001 and U.S. provisional application No. 60/264,421, filed Jan. 26, 2001, and which is a continuation-in-part of U.S. patent application Ser. No. 09/609,893, filed Jul. 5, 2000, now U.S. Pat. No. 6,760,754, which claims the benefit of U.S. provisional application No. 60/184,180, filed Feb. 22, 2000. The contents of application Ser. Nos. 11/258,337, 09/823,167; 60/260,035; 60/264,421; and 09/609,893 are incorporated by reference herein. The present application is also related to U.S. patent application Ser. No. 09/834,089, filed Apr. 12, 2001 and Ser. No. 10/851,815, filed May 21, 2004.

BACKGROUND OF THE INVENTION

This invention relates to interactive communications, and more particularly, to a system, method and apparatus for communicating in a distributed network via instant messages.

One of the more beneficial aspects of the Internet, aside from the vast array of information and content sources it provides, is the varied and newfound ways people can now communicate and stay in touch with one another. Users all around the world, or even just around the corner, may now communicate in a relatively low cost and efficient manner via a myriad of Internet facilities including electronic mail, chat rooms, message boards, text based instant messaging and video teleconferencing.

These methods of communication offer distinct advantages over standard communicative methods such as paper based mail and conventional telephone calls. For example, facilities like electronic mail are typically considerable faster and cheaper than these conventional methods of communication. Rapidly escalating in popularity is text based instant messaging which offers more instantaneous gratification with respect to interactive communications between two or more users.

However, one main problem with presently available forms of text based instant messaging and facilities like electronic mail is that both text based instant messaging and electronic mail are still both somewhat impersonal, especially compared with something like conventional telephone conversations where vocal intonation, tone and feedback provide a much needed flavor of humanity and personality to the communications. Text based instant messaging and electronic mail also typically require the users to have access to input devices such as keyboards to facilitate the creation and transmission of messages to one user from another. The quality of such communications thus depends heavily on each user's typing speed, accuracy and network connection quality of service. Furthermore, users without access to input devices such as keyboards may find it very difficult to conduct meaningful conversations without have to endure tedious keystroke input procedures.

Accordingly, it would be desirable to have a way to communicate with other users in still an efficient and quick manner but with a more personal touch than provided by other modes of electronic based communications. It would be further desirable to be able to communicate with other users on multiple devices and be able to keep track of the users on these multiple devices so that communications are not lost in the network. It would also be further desirable to be able to have users on multiple devices receive messages at their currently active client device.

SUMMARY OF THE INVENTION

The present invention is a system, method and apparatus for facilitating communications among a number of distributed users who can send and receive short sound earcons or sound instant messages which are associated with specific conversational messages. The earcons are typically melodies made up of short strings of notes. Users conversing with one another via the earcons are responsible for learning the meaning of each earcon in order to effectively communicate via the earcons. Visual aids may be provided to aid users in learning the meaning of the earcons.

In one embodiment of the present invention, the earcons are represented via visual icons on their respective communicative devices, such as their personal digital assistant devices, personal computers and/or wireless telephones. One embodiment of the present invention is a system for facilitating communication among a plurality of distributed users. The system includes a plurality of distributed communicative devices, a plurality of sound instant messages for playing on each of the distributed communicative devices and a central server which receives a request from one or more of the plurality of distributed communicative devices, transmits the request to one or more of the plurality of distributed communicative devices identified in the request wherein the one or more of the plurality of distributed communicative devices identified in the request will play the one or more of the plurality of sound instant messages also identified in the request.

The present invention is also an apparatus for facilitating distributed communications between a plurality of remote users which includes a display screen, at least one icon displayed on the display screen, the at least one visual icon associated with an earcon made up of a series of notes associated with a communicative message, and a transmitter for transmitting the earcon from the first user to at least one other user.

The present invention also is a method for communicating via sound instant messages which includes receiving one or more sound instant messages, caching the plurality of sound instant messages, receiving a request to play at least one of the cached sound instant messages and playing the at least one of the received sound instant messages from the plurality of cached sound instant messages.

The present invention further includes a method of establishing sound based communications among a plurality of distributed users in a communicative network which includes determining which of the plurality of distributed users are currently on the network, receiving a request from at least one user on the network, wherein the request identifies one or more users in the network and at least one sound instant message designated for the one or more identified users and transmitting the one or more sound instant messages to the one or more identified users in the network.

In the present invention, personal sound identifiers may accompany a sound message or earcon such that the receiving user will be alerted to the identity of the user who sent them the sound message or earcon. The earcons are typically short snippets of song riffs or some otherwise random selection of notes or sounds which are used to uniquely identify each user to one another.

The present invention is also a method for receiving a message from a message sender designated for at least one message recipient and providing status indicators as to the status of the message. In one embodiment, the method includes the steps of determining when the message is received by the at least one message recipient, wherein a determination that the message is received is confirmed by a message acknowledgement and providing a status indicator update for the message sender, the status indicator update comprising a visual representation of the message having a first appearance when the message is pending and a second appearance when the message is received by the at least one message recipient.

The message status indicator may be provided as a color or a pattern change to distinguish between the pending message status and the received message status. Message listings are created at both the sending client and the receiving client so that the sending client knows which messages have been received and the receiving client knows that the message has been seen already to discourage duplication of a message at a certain client location.

DETAILED DESCRIPTION OF THE INVENTION

Figure 1:
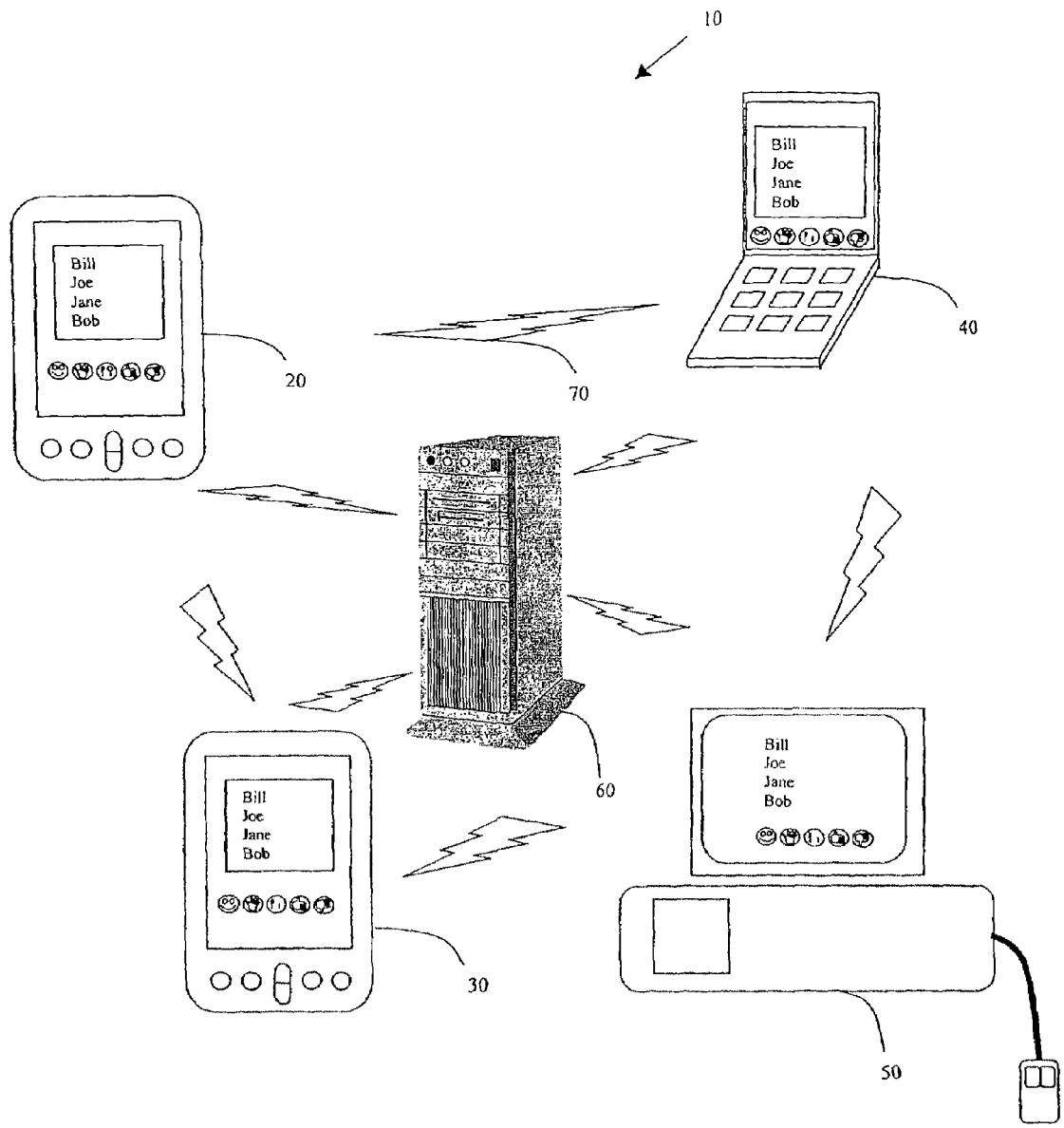
FIG. 1 is a diagram of an exemplary system in accordance with the teachings of the present invention.

Referring to FIG. 1, an exemplary communications system 10 is shown in accordance with the present invention wherein users in the system may communicate with one another using sound messages or "earcons" and/or personal sound identifiers. As used herein and described in more detail later herein, the terms "sound messages", "sound instant messages" or "SIMS" and "earcons" which are used interchangeably herein, mean a short series of notes and/or sounds which are associated with or representative of any number of short communicative phrases. These short communicative phrase may be any conversational message such as "Hi", "Hello", "Are you ready to go?", "Meet you in five minutes", "I'm heading home" and a virtually infinite variety of these and other phrases. For example, a short string of six notes could be constructed to mean "Are you ready to go?" while another unique short string of four notes could be constructed to mean "Hello." Typically, each user will be provided with a basic "set" of conventional or standardized earcons which have predefined meanings such that users may readily communicate with one another using these standardized earcons without having to decipher or learn the meaning of the earcons. Additionally, new earcons may be created by each user such that when using these user-created earcons, each user is responsible for the task of interpreting and learning each other user's respective earcons in order to effectively communicate via the earcons or sound messages.

As used herein and described in more detail later herein, the term "personal sound identifier" refers to one or more short or abbreviated sound snippets which a user may use to identify themselves to another user. These sound snippets will typically be short melodies made up of short strings of notes which a user will use to identify themselves to other users in the system. The personal sound identifiers may also be snippets or riffs of popular songs, themes or melodies. Both the earcons and personal sound identifiers may be selected by a user from a predetermined selection or the sound messages and personal sound identifiers may be created by user individually, as discussed in more detail later herein.

In the present invention, text Instant Messages or "TIMS" may also be used along with or instead of the SIMS described above and/or the personal sound identifiers described below.

In one embodiment, the earcons and personal sound identifiers are used on a selective basis, whereby a user may or may not provide their personal sound identifier with each earcon sent by that user to other user(s). In another embodiment, every earcon is accompanied the user's personal sound identifier. For example, if a user's earcon is a three note melody and that user wishes to send another user an earcon which means "Are you ready to go?", the other user will hear the three note melody followed by the earcon which means "Are you ready to go?" In this manner, users can readily identify the source of the earcon which is especially valuable when multiple users are sending each other earcons during a single communicative session. Certain system rules may also be implemented regarding the playing of the personal sound identifiers. For example, if a user has received a series of earcons from a single other user, the sending user's earcon will not be played every time since it can be assumed that the receiving user is already aware of the sending user's identity. Other rules may be implemented, for example, if a user has not received any earcons for a specified period of time, such as 15 minutes, any earcons received will automatically be preceded by the sending user's personal sound identifier.

As shown in FIG. 1, the system 10 includes one or more communicative devices, such as personal digital assistant (PDA) devices 20, 30, wireless telephone 40 and personal computer 50. In the present invention, the devices, such as personal digital assistant (PDA) devices 20, 30, wireless telephone 40 and personal computer 50 are in communication with one another and with a central server 60 via a plurality of communication transmissions 70. In one embodiment, each device is associated with an individual user or client but in other embodiments, a single user or client may be associated with two or more devices in the system.

Each device may be in communication with one another and central server 60 through a wireless and/or a wired connection such as via dedicated data lines, optical fiber, coaxial lines, a wireless network such as cellular, microwave, satellite networks and/or a public switched phone network, such as those provided by a local or regional telephone operating company. In a wireless configuration, the devices may communicate using a variety of protocols including Transmission Control Protocol/Internet Protocol (TCP/IP) and User Datagram Protocol/Internet Protocol (UDP/IP). Both the TCP/IP and/or the UDP/IP may use a protocol such as a Cellular Digital Packet Data (CDPD) or other similar protocol as an underlying data transport mechanism in such a configuration. In the present invention, one to one messaging as well as multicast messaging from one user to a group of two or more users may be implemented easily via a UDP-based protocol.

In an exemplary embodiment, the devices preferably include some type of central processor (CPU) which is coupled to one or more of the following including some Random Access Memory (RAM), Read Only Memory (ROM), an operating system (OS), a network interface, a sound playback facility and a data storage facility. In one embodiment of the present invention, a conventional personal computer or computer workstation with sufficient memory and processing capability may be used as central server 60. In one embodiment, central server 60 operates as a communication gateway, both receiving and transmitting sound communications sent to and from users in the system.

While the above embodiment describes a single computer acting as a central server, those skilled in the art will realize that the functionality can be distributed over a plurality of computers. In one embodiment, central controller 70 is configured in a distributed architecture, with two or more servers are in communication with one another over the network.

Figure 2:
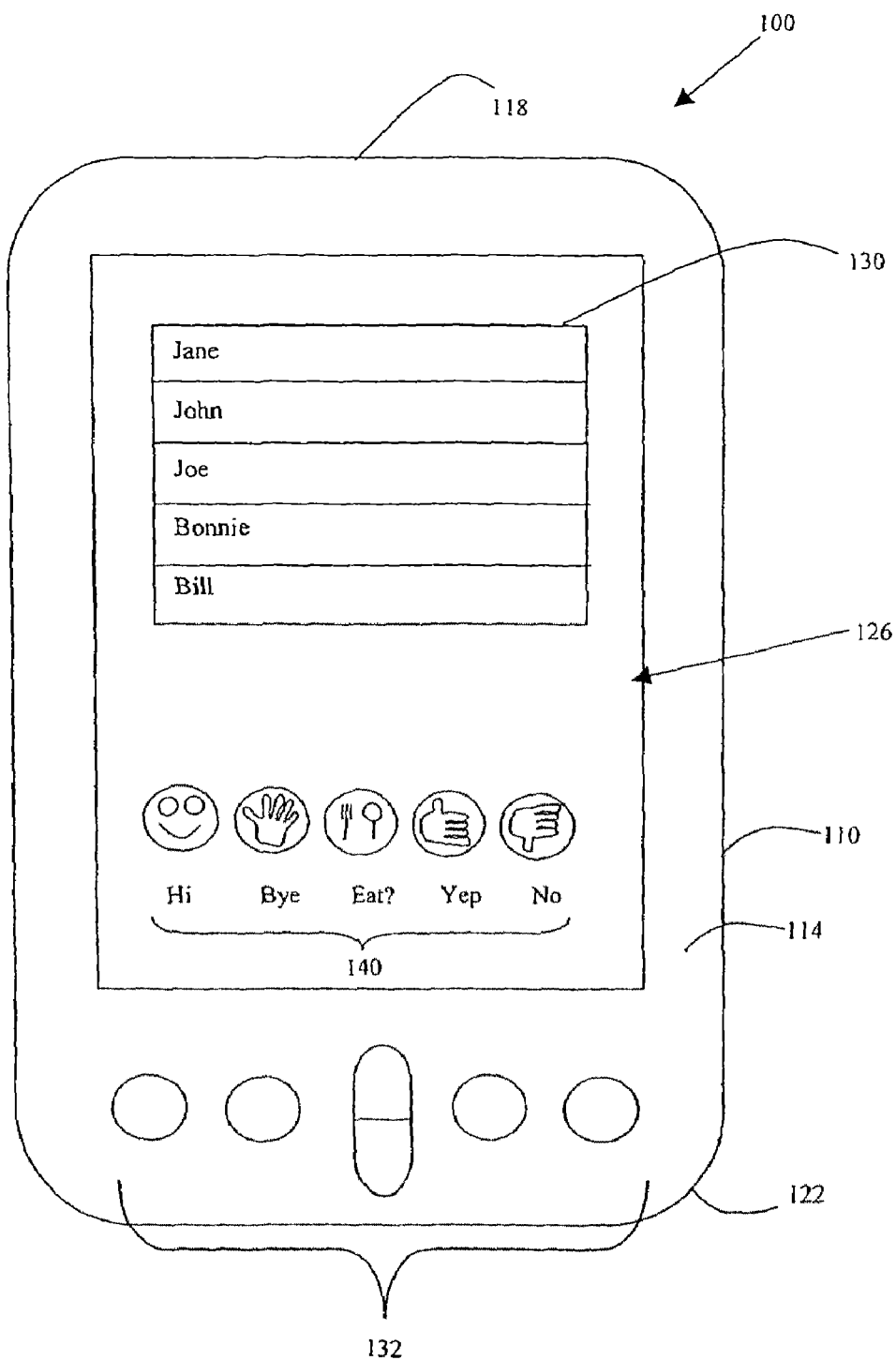
FIG. 2 is a diagram of an illustrative communicative device in accordance with the teachings of the present invention.

Referring to FIG. 2, an exemplary device for creating, storing, transmitting and receiving sound messages and/or personal sound identifiers is shown. As shown in FIG. 2, the device is a type of Personal Digital Assistant (PDA) 100. It is known that PDAs come in a variety of makes, styles, and configurations and only one out of the many makes, styles and configurations is shown. In one embodiment of the present invention, PDA 100 includes a low profile box shaped case or housing 110 having a front face 114 extending from a top end 118 to a bottom end 122. Mounted or disposed within front face 114 is a display screen 126. Positioned proximate to bottom end 122 are control buttons 132. Display screen 126 may be activated and responsive to a stylus, control pen, a finger, or other similar facility, not shown. Disposed within housing 110 is a processor coupled with memory such as RAM, a storage facility and a power source, such as rechargeable batteries for powering the system. The microprocessor interacts with an operating system that runs selective software depending on the intended use of PDA 12. As used in accordance with the teachings herein, memory is loaded with software code for selecting/generating, storing and communicating via sound messages and/or personal sound identifiers with one or more other users in the system.

Referring again to FIG. 2, in one embodiment, the display screen 126 includes a screen portion 130 which displays the name, screen identification or other identifying indicia one or more other users on the network. In one embodiment, a user may be able to maintain a list of users on their device and when such as user becomes active on the network, the display will provide some indication to the user, such as by highlighting the name in some manner, to indicate that the user is available on the system. For example, an icon may appear proximate to the name of a user who is available or present on the system.

As used herein, the term "available" may include both when a user is currently "active", such as when they are presently using their communicative device or the term "available" may include when a user is "idle", such as when the user is logged on but is not currently using their respective communicative device. In certain embodiments, a different icon may be used to distinguish between when a user is in an "active" or in an "idle" state. In the present invention, clients or users via their respective communicative devices such as PDAs, laptops, PCs, etc. may update a centralized server with their presence information via a lightweight UDP-based protocol. Typically, the server will fan a client's presence information out to other users or clients that have indicated an interest and have permission to see it. Thus in a case where one user may be "logged on" on two or more devices, the sound message request will be transmitted to the user on the device which is deemed to be currently in an "active" state. In the present system, users may be alerted as to the state change of other users in the system, such as when a certain user becomes "active" or changes from "active" to "idle." Such alerts may be provided via sound-based alerts which will indicate the state changes to the users. Such alerts may be followed, for example, by the user's personal sound identifier which identifies the user who has changed their respective "state."

As shown in FIG. 2, the display screen 126 includes one or more visual indicia or icons 134 which are associated with one or more sound messages, sound instant messages or earcons. For example, five different representative sound icons 134 are shown, each icon associated with a distinct sound message or earcon such as "Hi", "Bye", "Eat", "Yep" and "No". To facilitate communication via the earcons, each icon may include a textual or visual label to assist the user in remembering which icon is associate with which earcon. For example, referring to the icons 134, the "Eat" icon may includes a picture which hints as to the meaning of the earcon, such as a fork and spoon as illustrated and may also include a textual label such as "Eat?" As discussed in more detail later herein, each sound message may be user created, such as the user employing a sound creation/editing utility which the user may use to compose the earcon or the user may select from system provided earcons from which a user may make selections. Similarly, icons 134 which are associated with the earcons may be user created such as via specialized software for designing and editing bitmaps of icons and/or the icons may be provided by the system from which a user may select.

Referring again to FIG. 2, the display screen 126 may further include a visual log for recording and displaying the different sound message or earcons which a user may have received. Such a visual log may aid a user in learning the meaning of earcons for which the user is unfamiliar with.

Figure 3:
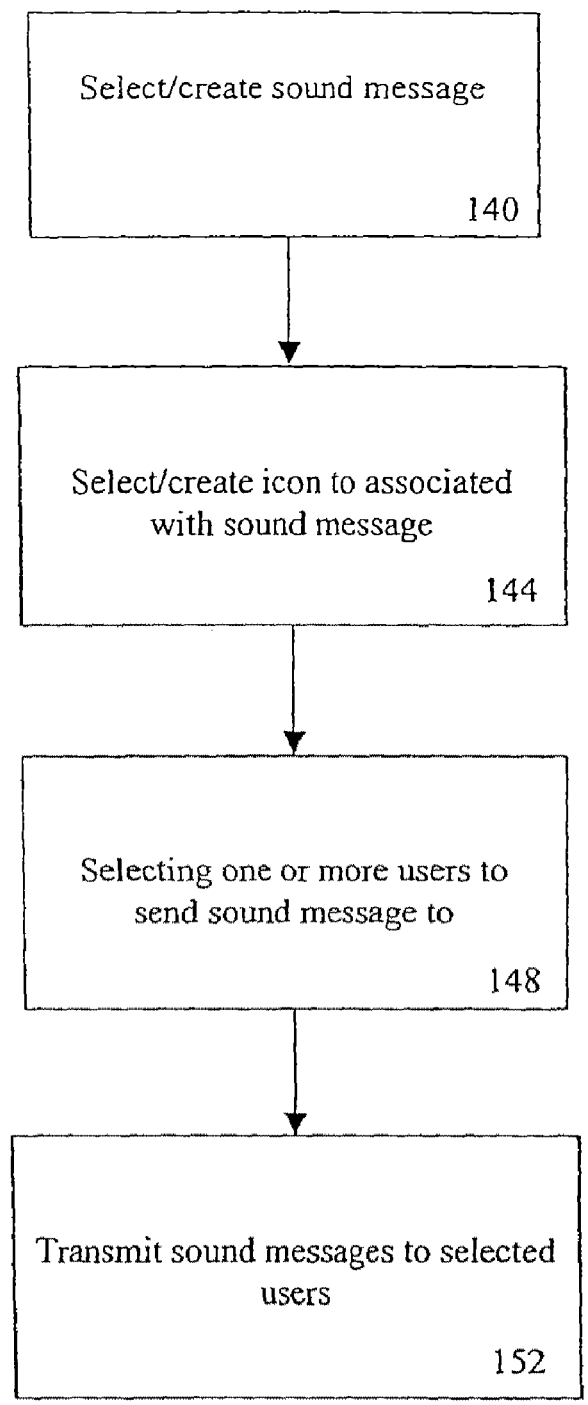
FIG. 3 is an exemplary method in accordance with the teachings of the present invention.
Figure 4:
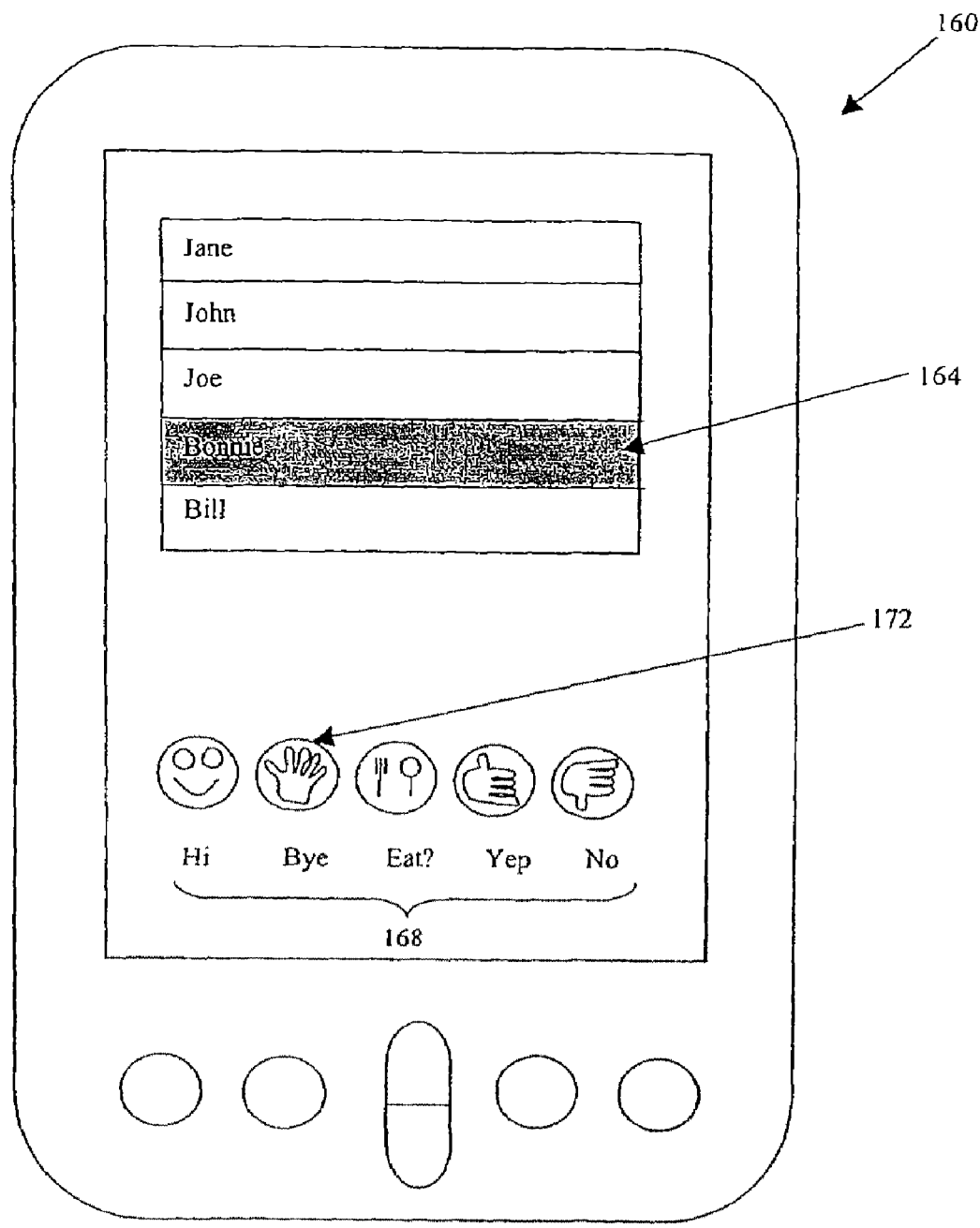
FIG. 4 is another diagram of an illustrative communicative device in accordance with the teachings of the present invention.

Referring now to FIGS. 3 and 4, an exemplary method and device is shown for creating and transmitting sound messages and/or personal sound identifiers between users in the system. As shown in FIG. 3, the user creates a sound message, step 136. A sound message may be created by simply selecting a sound message from a selection of pre-recorded sound messages or sound message may be newly created by a user, such as by employing a sound editor utility to construct a sound message. Once a sound message is created, the sound message is saved, step 140. Saving may be done locally on a user's personal communicative device by simply saving the sound message with, for example, a sound editor utility as a sound file on the device's storage facility. The user may then select or create an icon to be associated with the sound message, step 144. The icon may be selected from a selection of already existing icons or may specially created by the user via a graphics utility or facility. In other embodiments, an icon may be assigned to the sound message automatically. Once an icon is selected/created and is now associated with a specific sound message, the user may send the sound message to any number of users in the system. To accomplish this, the user may select one or more users to send the sound message to, step 148. This may be accomplished, as discussed in more detail later herein, such as by selecting one or more user names from a directory of users. The user may then transmit the sound message to the selected users by selecting or activation the icon associated with the desired sound message, step 152.

As discussed in more detail later herein, typically the file in which the sound message or earcon is stored is not itself transmitted to users directly. Preferably, each user already has a "copy" of the sound message stored or cached locally such that only a request or command to play the sound message is transmitted by the user. However, in cases where a user just created a new sound message, the sound message would first need to be distributed to the other users in the system. Preferably this is accomplished on "as-needed" basis whereby the new sound message is transferred "on-the-fly" to users who does not yet have a stored or cached version of the new sound message. For example, the user who has created the new sound message will simply send the sound message like any other sound message at which point the receiving user who does not yet have the sound message will request transfer of the new sound message.

In other embodiments, the proliferation and distribution of sound messages or earcons may be accomplished by having specialized software automatically distribute a new sound message to the other users when the software detects that new message has been created. In another embodiment, a central repository of sound messages or earcons may be administered via a central server, such as illustrated in FIG. 1. In this embodiment, the central server would maintain a central repository of all sound messages or earcons in the system and would periodically update user's devices with the earcons as new one were created. Similar methods may be used to delete sound messages or earcons which are obsolete or unwanted.

In the present invention, as new sound messages or earcons are created, each sound message is assigned a unique identifier, which can be a numerical identification (ID), alphabetical ID, a combination thereof or other unique identifier which is unique to that particular sound message. In this manner, sound messages or earcons are identified within the system between users via these unique identifiers.

In one embodiment of the present invention, the files containing the sound messages or earcons are stored locally on each user's local device such as their PDA. Sound messages may be stored as sound files in any one or other file formats such as in a MIDI file format, a .MP3 file format, a .WAV file format, a .RAM file format, .AAC file format and a .AU file format.

Referring now to FIG. 4, an exemplary device 160 for implementing the steps as discussed above and shown in FIG. 3 is shown. In this embodiment, a user may send one or more other users a sound message or earcon as follows. The user employing the device 160 makes a selection from a screen portion 164 which lists some identifying indicia, such as the names of system users, shown herein "Elena, Alan, Dipti, Bonnie and Maya." In an exemplary embodiment, one user say for example, "Elena", selects "Bonnie", by selecting via a stylus, not shown, the name "Bonnie" which is then subsequently highlighted. The user then taps or selects the appropriate icon from the selection of icons 168 which is associated with the sound message or earcon the user wishes to send to "Bonnie." For, example, if the user wishes to send the sound message "BYE" to "Bonnie" the user will simply select the icon "BYE" 172 which will transmit the associated earcon to "Bonnie", or more specifically a command or request will be transmitted to "Bonnie" to play the earcons associated with icon 172. "Bonnie's" respective device will then undertake playing the sound message, such as via a sound playback facility which may include a sound processor and a speaker component. In one embodiment, only the "BYE" earcon is played on "Bonnie's" device and in other embodiments, the "BYE" earcon is accompanied by "Elena's" personal sound identifier. Thus, if "Bonnie" did not already know that the earcon originated from "Elena", "Elena" personal sound identifier should provide "Bonnie" with this information. Typically, the personal sound identifier will be played before playing the earcon but the personal sound identifier may also be played after the earcon is played. In the present invention, it is contemplated that a user may send another user a series of sound message by multiply selecting two or more earcons to send to the user. In this manner, a user may actually construct phrases or sentences with a variety of independent earcons strung together. A user may also send the same earcon to multiple users simultaneously.

Figure 5:
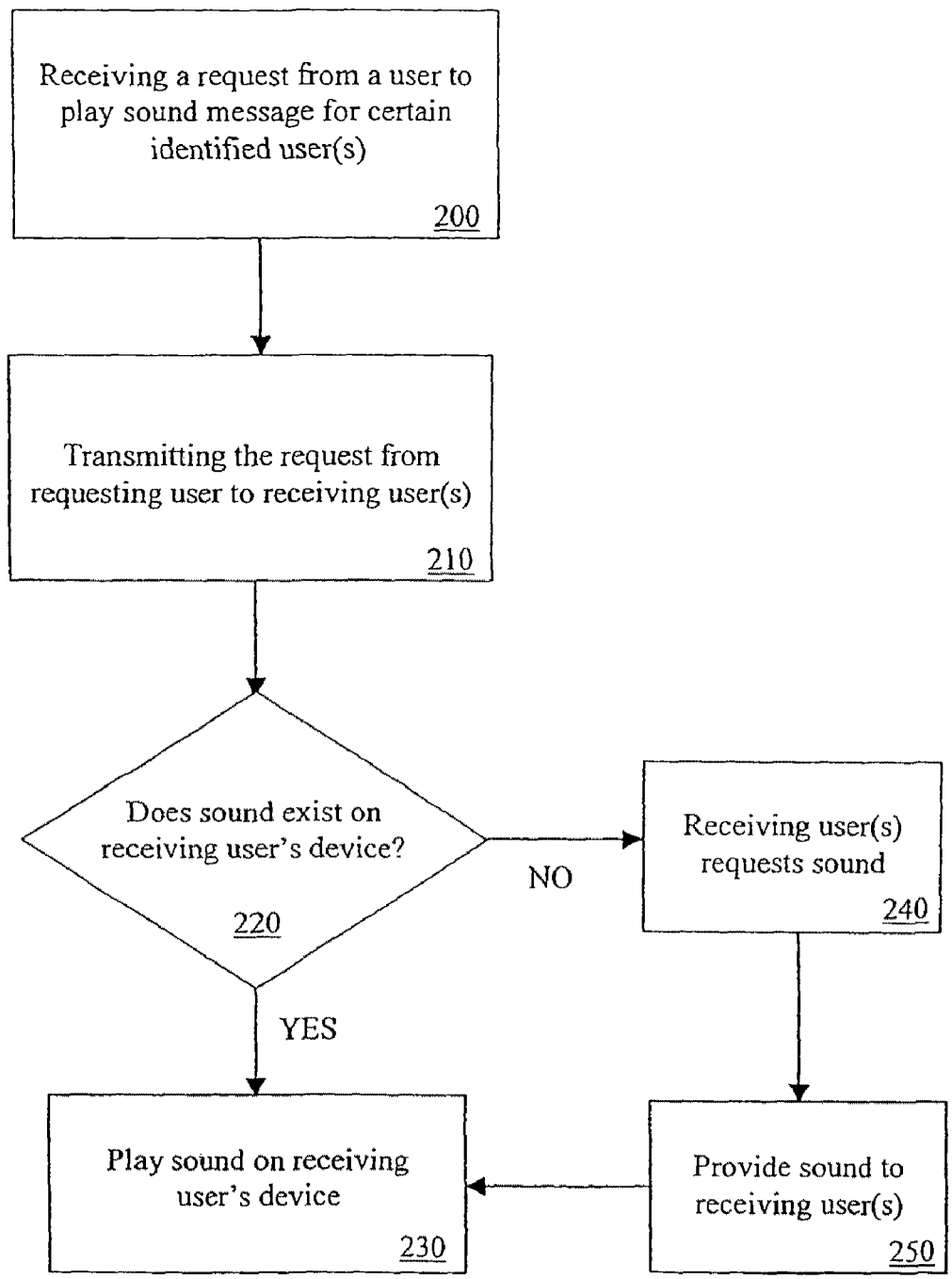
FIG. 5 is another exemplary method in accordance with the teachings of the present invention.

Referring to FIG. 5, an exemplary method for facilitating communications in accordance with the present invention is shown. In this embodiment, a command or request is received from a user to send one or more users a sound message(s) or earcon(s), step 200. In its most basic form, a user request identifies the user or users to which the sound message is intended for, and a unique identifier or ID of the sound message to be played. As discussed above, the request may be simply the user selecting one or more names on the user's display screen and activating the icon associated with the sound messages the user wishes to send. Alternatively, the request may also include the requesting user's personal sound identifier as discussed earlier herein. The request will be transmitted to the receiving user's device, step 210. Once the request is received, it is determined if the sound message exists on the receiving user's device, step 220.

As discussed earlier herein, each user's device in the system will preferably have a locally cached or stored selection of sound messages or earcons created by other users in the system such that when one user sends another user a sound message, the sound will simply be played from the selection of locally resident sound messages. Thus, a determination if a sound message exists on the receiving user's device may be accomplished by comparing the unique identifier of the sound message contained in the request with the unique identifiers of the sound messages already existing on the receiving user's device. If a sound message does not exist on a user's device, a request for the missing sound message is made, step 240. Ideally, specialized software on the receiving user's device will automatically administer the request for a missing sound message. The missing sound message may either be requested directly from the requesting user or from a central server which may maintain a current selection of sound messages. The missing sound message is then provided to the receiving user, step 250. The message can then be played on the receiving user's device, step 230.

In one embodiment of the present invention, the sound message request includes the requesting user's personal sound identifier or at least some indication as to the identity of the user sending the request. Thus, the receiving user(s) device will play the personal sound identifier along with playing the sound message. In one embodiment, each user's personal sound identifier may be distributed to other users in the system similar to the manner in which sound message sound files are distributed to users in the system and stored on their local devices. The actual personal sound identifier may also be simply transmitted along with the request as discussed above. In this embodiment, a receiving user would receive the personal sound identifier along with the request to play a certain sound message. The personal sound identifier would be played along with the stored sound message.

In another embodiment of the present invention, the playing of a user's personal sound identifier may be performed automatically by each user's device. The user's device would play a user's personal sound identifier whenever a sound message is received from that specific user. In this manner, specialized software provided on the device will determine which user has sent a sound message and then play that user's respective personal sound identifier.

In one embodiment of the present invention, the sound message communications will support message authentication, and optional message encryption. In one embodiment, authentication will likely be accomplished by including an MD5 (message+recipient-assigned-token) MAC with the message. A Tiny Encryption Algorithm (TEA) for the encryption layer may also be used in one exemplary embodiment. Of course other authentication and encryption algorithms may be used.

In the present invention, each unique device such as a PDA, wireless telephone or personal computer is associated with a single user. However, at times a single user may be active on two or more devices, such that a user may communicate via the sound messages with users via the two or more devices. For example, a single user may be in communication via their PDA as well as their wireless telephone at the same time. In this manner, a display screen such as the one shown in FIGS. 1, 2 and 4 may provide some indication that the user is on multiple devices at the same time. For example, some type of visual indicator such as a representative icon may be displayed next to the user's name to show that the user is on both their PDA and wireless telephone device simultaneously. In such an embodiment, a request or command to play a sound message will be sent to the user's device on which the user is currently active.

In the present invention, a potentially unlimited variety of communication scenarios are possible using the sound messages of the present invention, such an exemplary ritualized conversations is displayed below between a number of exemplary users where the users are exchanging a series of communicative earcons with one another:

sage. In one further exemplary scenario, exemplary USER X, USER Y and USER Z would allow each others sound messages to be propagated to one another such that USER X, USER Y and USER Z each would have a complete set of locally stored sound messages selected/created by the other users. For example, USER X would have locally saved versions of all the sound messages selected/created by USER Y and USER Z and so on.

In the present invention, a user may be logged on from as many different clients as desired, e.g. a home PC, a work PC, a laptop, and a Palm or other variations/combinations of device usage may be employed simultaneously. In contrast, other prior art Instant Messengers (IMs) may automatically log a user out as soon as the user logs in from another location (device). In the present invention, all the places where a client is logged in are tracked along with the "active" or "idle" status of the user at each respective location (device). As used herein, active means the user has used an input device, such as a mouse or keyboard on the PC, or pen taps on the Palm, within a predetermined amount of time, such as the last five minutes. As used herein, the term "idle" means the user has not used an input device for a predetermined amount of time, such as a few minutes or longer, depending on the preferences of the user and/or system administrator.

In the present invention, if a user is logged on one device and then becomes active or logs in from another device, the system automatically notices, and switches the "active device" to the new device. For example, if a user is at their desktop and then subsequently activates a personal digital assistant device, as soon as the personal digital assistant device is activated, the server notices the client's new location

| | | |
|---|---|---|
| Ann: <Earcon for "Hi!"> | Bonnie: <Earcon for "Lunch?"> | George: <Earcon for "Ready?"> |
| Nancy: <Earcon for "Hi!"> | Dipti: <Earcon for "Sure!"> | Maya: <Earcon for "In 5"> |

In this manner, users can quickly contact each other and make arrangements or just let each other know they're thinking about each other without requiring undue amounts of keystrokes, actions or input on the part of the users. Personal sound identifiers or sound identification may also be used herein to identify users to one another on the system. As discussed earlier herein, personal sound identifiers are unique abbreviated sounds which associated with specific users. For example, in the above illustrative communication, user "Ann" may have a personal sound identifier which resembles a portion of the "Hawaii-Five-O" theme song, user "Bonnie" may have a random three note melody as a personal sound identifier and user "Dipti" may have a personal sound identifier which resembles a portion of the famous song "Smoke on the Water". Thus, if user "Ann" were to send user "Bonnie" an earcon, the earcon would be preceded by the short snippet from the "Hawaii Five-O" theme song followed by the earcon to signal user "Bonnie" that the earcon was from "Ann." In conversing via the earcons, users may selectively accept and reject earcons from certain users or all users as desired. For example, user "Ann" may configure her device to accept earcons from all users, specific users such as "Bonnie" and "Dipti" or alternatively, not accept any earcons from any user. Such a configuration may be provided via specialized software on the user's respective device which allows the setting of these possible configurations.

In the present invention, only those users who have indicated a willingness or provided the necessary permission to receive such sound messages will receive such sound mesby having the personal digital assistant provide a signal to the server that the user is now active on that device.

In the network, a selected user's "buddies" can see where the user is through their respective system interfaces. So as soon as the selected user moves to a new active client, all of the user's buddies' interfaces update to show that now the user is now on the personal digital assistant device, whereas before the user was on their work PC.

In this embodiment, if any of the user's buddies sends the user a message, that message will automatically go to the user on the user's active client, whichever one that is. The user's buddies don't have to worry about where the user is, i.e. the user's exact active location since the message communicating process operates in a transparent fashion to the message originator or sender. The sender of the message, i.e. one or more of the buddies, can simply proceed with creating and sending their message(s) in the fashion described herein without regard to the user's active location since the server will forward the message(s) to the user's active client device, as discussed in more detail later herein.

In certain situations, where the user is "idle" on multiple client devices, a message sent to the user will be handled by providing the message to all the idle clients to ensure that the message will get to the user. In another situation where a user may be currently active on a client but then some time thereafter ceases to be active such as in a situation where the user may be at work and then leave to go home, a message may be sent to that user during that transition period, i.e. the period between when they were last active on their work device and the time they become active, on say their home device. In such a situation, the user will typically not see the message since the message was sent to the client, i.e. work device, which was perceived to be currently active. The sender of the message also may not realize that the user didn't see the message, because the user "looked active" when they sent it. The present invention resolves the preceding situation as follows: If a user receives a message at one client where they're currently active and if the user doesn't use any input devices on that client after the message arrives and then they become active on a different client, the message will be resent to the new client. If the user later becomes active on that same client, the message is not resent, since the message is already sitting there. This handles the case of a user walking out just before a message arrives and then becoming active or logging in from another client.

In the present invention, users may track the activity status of other users or buddies in the network in a number of manners. In one embodiment, when the user is in a text conversation with someone else, a window footer tells them which of three states the other party or parties are in. For example, three exemplary activity states are "X is not focused in this window", "X is focused in this window" and "X is typing in this window" where X is the party or parties. These states may appear as soon as the other party or parties moves their cursor out of the text window shared with the user, as soon as the party or parties move their cursor into that window, or as soon as the party or parties start typing, respectively. For example, if they are on the Palm, "into" or "out of" a window means they are viewing the user's IM screen or not viewing it. Users may also put an IM conversation "on hold" on the Palm so the user can go back to it, even if they go out of the window which can help users coordinate their conversations.

In one exemplary embodiment, User Datagram Protocol (UDP) is used as the messaging protocol. However, other protocols may be used to facilitate messaging between clients, such as any other Internet Protocol (IP) compatible protocol. Typically, UDP may be classified as an unreliable but lightweight message protocol. That is, messages are sent but there is no open connection between the parties, so it's possible that messages can be dropped. UDP or other similar message protocol may be used which is more suitable to wireless connections in embodiments employing wireless devices since these are likely to have communications that are to be frequently broken and re-established. In the present invention, certain mechanisms are implemented to increase the likelihood that messages will arrive without paying the cost of maintaining and re-establishing an ongoing connection, which typically consumes valuable CPU and bandwidth and affects performance.

Figure 6:
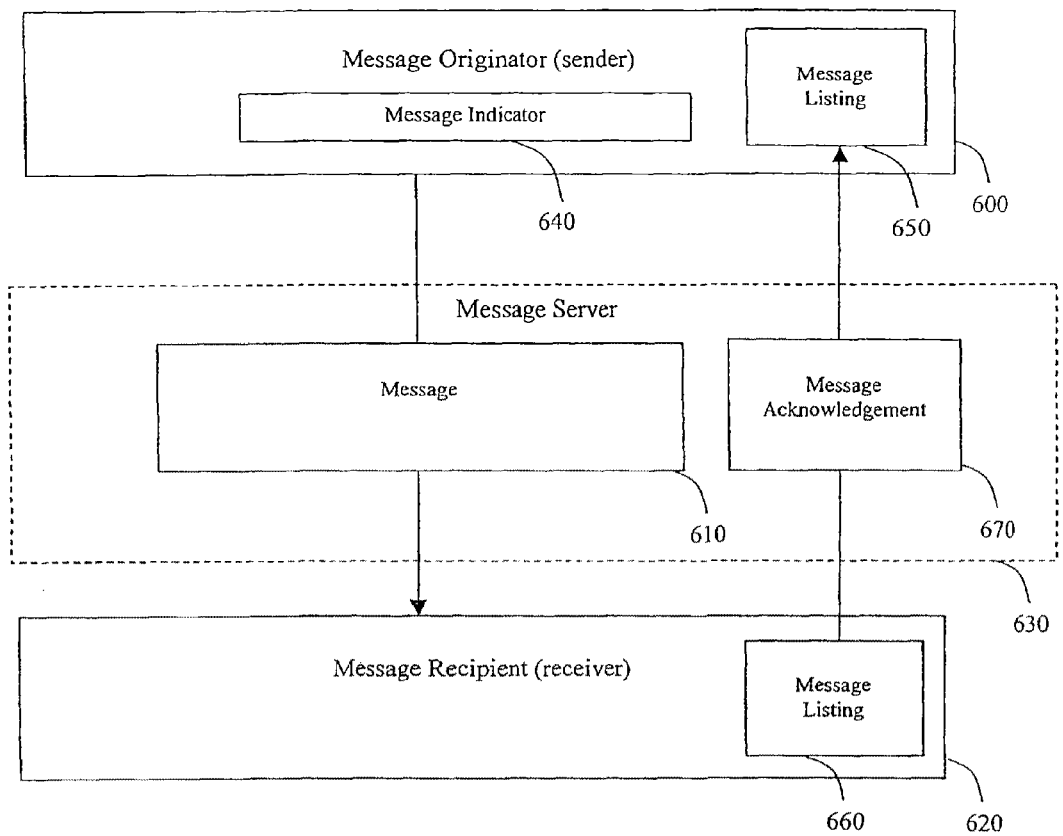
FIG. 6 illustrates an exemplary instant message communication setup in accordance with the teachings of the present invention.

Referring to FIG. 6, an exemplary messaging configuration is shown. In this embodiment, a message originator or sender 600 sends a message 610 to at least one message recipient or receiver 620. Message 610 is sent via a message server 630 which receives message 610 from message sender 600 and provides message 610 to message recipient 620. Once message 610 is received by message recipient 620, message recipient 620 provides a message acknowledgment or ACK 670 back to message sender 600. A message listing 650 may be updated by message sender 650 once the ACK 670 is received from message recipient 620 while a message listing 660 may be updated by message recipient 620 once message 610 is received. Updating message listing 660 by message recipient 620 prevents messages being duplicated, such as in the case of where message ACK 670 is not received by message sender 600 and consequently, message sender 600 re-sends another copy of message 610 to message recipient 620. In such an example, the re-sent message will be compared with the message listing by message recipient 620 and will be discarded if the re-sent message has already been tagged as being seen, as discussed in more detail later herein.

In a typical messaging exchange, there are at least four hops between which a message can be dropped. It is possible for someone to receive a message but for the sender not to know this because the acknowledgement may be dropped on the way back to the sender. And of course it is possible for a message not to arrive at the recipient. If either party has a poor connection to the server, it's not uncommon for the message or the ACK to get dropped.

In conversation, it's critical for both parties to know what they mutually know. It can cause a lot of confusion if one party thinks they've said something when in fact the other person has not seen the message. In the present invention, the user interface via a message status indicator helps the users know what was seen by both parties and what might not have been. When the user sends a message, that message appears in the text area in a "pending" style, to indicate it has not yet been received, and then changes to a "final" or "received" state to indicate that it has been received. In one embodiment, the message appears in gray type when the message is "pending", and then it switches to a certain color, such as blue, when the client gets an ACK. In a situation where an ACK never arrives, the text stays gray. On a personal digital assistant device, the message may appear inside curly brackets and the brackets are removed when the ACK arrives. Other variations of the pending and received status indicators may be implemented, for example, in a pending status, the message status indicator may appear in a certain first pattern or color, while in a received status, the message status indicator may appear in a second pattern or color which is distinguishable from the first pattern or color. In another embodiment, the message may not be visible at all when the message is pending.

In this embodiment, it is not possible for someone to believe that they said something when the other person didn't see it, but it is possible for a recipient to see a message while the sender thinks they didn't. This can cause just as much of a problem in a conversation. In such a situation, the present invention provides certain safeguards to prevent this problem. For example, when a client sends a message, it waits to see if it gets an ACK for a predetermined number of seconds, such as, for example, anywhere from one to ten seconds. If it does not, it resends the message. It does this as many as X times, stopping as soon as it gets an ACK. X may be any number, such as in the range of one to fifty, depending on the requirements desired. On the other end, if a message arrives that the client has already received, it sends back an ACK but it does not re-display the message. In this way, each client properly indicates whether the message got through to the other end, but no message will appear multiple times on the recipient's screen. It is possible, though, for the messages to appear in a different order on both sides. If, for example, the sender sends two messages and the first one is dropped along the way, the first message will be resent after an X number of seconds, and it will be displayed on the recipient's screen after the first.

With this approach, if someone sees that a message they sent is pending, i.e. in gray and it stays pending, i.e. gray, they can be pretty confident that the other person did not get the message. This can happen because of a number of situations, such as if the sender's connection is poor or because the recipient's connection is poor. To help distinguish these cases, cues are provided to the user about their own level or connectivity and to let them know if the other person has gone offline, as described in more detail later herein.

A more detailed explanation of the messaging process of the present invention now follows with associated pseudo code to represent the methodologies involved. In the present exemplary embodiment, messages are currently sent via UDP packets, however, any type of packetized transport would be appropriate. In this packetized environment, acknowledgements or "ACK" are used to verify the receipt of the messages. Additionally, each message in the protocol is assigned a sequence number. Each client assigns monotonically increasing sequence numbers to messages it initiates, with each client keeping its own sequence. For example, say an exemplary Client A wants to send a message like a Text Instant Message "TIM" to an exemplary Client B. In this embodiment, this exchange may be represented as follows:

Client A sends [TIM "hi" (seq #100)]→Server→Client B

Client B sends [ACK "for #100" (seq #34)]→Server→Client A

It is conceivable that either the TIM or the ACK could get lost in transit, e.g. dropped due to interference in the network connection. Thus, when Client A sends the TIM, it also copies the message to a list of messages awaiting ACKs. Client A then waits for the ACK from Client B for that message as may be represented by the following pseudo-code:

```
sendMessage(message, clientB) {
    send message to clientB;
    copy message to list_of_messages_waiting_for_acks;
}
```

When Client B receives the message it sends an ACK back to Client A. In this embodiment, the ACK data contains the sequence number of the original TIM message so that Client A knows which of its messages have been ACKed. Client B also adds the incoming messages to a list of messages already seen, as explained in more detail later herein.

When Client A receives the ACK message, Client A updates its local display, e.g. the status indicator text goes from gray to blue indicating that Client B received the message, and the message is removed from the list of messages awaiting ACKS. Thus, the receipt of the ACK triggers the sending client to update its message list and consequently the message status indicator to a "received" status, as may be represented by the following pseudo-code:

```
receiveACK(ACK) {
    foreach message in list_of_messages_waiting_for_acks {
        if (the ACK matches the message in the list) then {
            remove this message from the
                list_of_messages_waiting_for_acks;
            update screen;
        }
    }
}
```

If Client A does not receive an ACK within a predetermined amount of time, say for example, anywhere from 1 to 30 seconds, Client A will resend the original message. This means that the Client A is periodically walking through the list of messages waiting for ACKS, as may be represented by the following pseudo-code.

```
checkWaitingMessages( ) {
    for each message in list_of_messages_waiting_for_acks {
        if (message was sent > 3 seconds ago) then {
            re-send message;
        }
    }
}
```

During operation, it is possible that an ACK might get lost. For example, if Client A sends a message to Client B, and Client B responds with an ACK that is then lost on the way back to Client A, Client A is going to resend its original TIM message again in 3 seconds. Since Client B has already received and displayed the TIM, it is preferable to make sure Client B doesn't display it again. To handle this, each Client keeps a list of the sequence numbers and senders of the last set of messages that it's received. This message listing may be compiled on a threshold limit basis whereby an X number of messages are kept in the message listing, where X is a predetermined number of message, such as anywhere from 1 to 1000. Additionally, the message listing may be kept on a time threshold basis where the messages are kept in the message listing based on a predetermined time limit, such as all message in the last minute, last five minutes, etc.

To further describe the operation of the present invention, when a client receives a message, it responds with an ACK (as it has to do each time) and it checks the sequence number and sender ID to see if it's seen this message before. If the client hasn't seen it before, it processes it (displays it, plays it, etc.). If it has seen it before, the message is simply discarded. In either case, it has already sent an ACK back to Client A so Client A can stop re-sending it, as may be represented by the following pseudo-code.

```
receiveMessage(message)
{
    respond with ACK for this message;
        if (message in list_of_messages_already_seen) then {
            discard message;
        } else {
            process message; // update display, whatever
            add message to list_of_messages_already_seen;
        }
}
```

The present invention also includes a method for resending messages to the next active client, so that if for example, a user switches devices, or logs on somewhere else, e.g. at another client device, the user will get messages the user might have otherwise missed.

In the present invention, all messages go through a server, as described and shown earlier herein. Typically, a message comes from a client addressed to a specific user. Since a user can be logged on from multiple locations, e.g. multiple client devices, the server must decide which of that user's clients is the best one to send the message to. To do this, the server uses the concept of the "last active client" as well as looking at whether all the user's clients are idle.

In the present invention, clients periodically update the server on their current activity state or how 'active' they are. This may be described by simply how much the user has used the mouse, keyboard, stylus or other input device on that machine in a predetermined time frame, such as in the last ten seconds. As used herein, the "last active client" is the client that most recently reported activity, e.g. a keystroke, mouseclick, stylus selection, etc. In the present invention, no recent activity may mean that the client is "idle."

Generally, the server may decide to route a message as represented by the following pseudo-code:

```
serverSendMessage(message, user) {
    if (all clients of user are idle) then {
        send message to all clients of user;
    } else {
        send message to last active client of user;
    }
}
```

There is a situation where the user may not receive the message in accordance with the above delivery methodology. For example, if someone sends a message to a user immediately after the user leaves their currently active client, i.e. the user's work PC for the night, the server is going to send the message to the user's work PC since it appears that the work PC is an active client. When the user gets home and either becomes active on their home machine, it would be desirable to see the messages that were sent to the user at my office since the user left. Otherwise, the message will remain unread at the work PC client until, for example, the user gets to work the next morning. So in this situation, when the user becomes active on the home client, the server resends the messages originally sent to the office client.

When the server sends a message to a client, it copies it to the list_of_messages_sent and notes the client that it was sent to. If the message was sent to multiple clients (as it might have been if they were all idle), all of those clients are noted. It keeps this list of messages sent so that it can resend them if a client other than the one(s) it was sent to becomes active next, as may be represented by the following pseudo-code:

```
serverSendMsg(message, user) {
    if (all clients of user are idle) then {
        send message to all clients of user;
        copy message to list_of_messages_sent;
        copy all clients to
        list_of_clients_this_message_was_sent_to;
    } else {
        send message to last active client of user;
        copy message to list_of_messages_sent;
        copy last active client of user to
        list_of_clients_this_message_sent_to;
    }
}
```

In the present invention, messages are removed from the list_of_messages_sent when a client in the_list_of_clients_this_message_sent_to reports in with an activity>0. This means that there is keyboard/mouse/stylus activity on that client, which means that the user must still be there and has seen the message. If another client (of that User) reports in with activity>0 next, then that means that the User must have switched devices (or logged on from somewhere else), and we need to resend the message to that (newly active) client.

So, whenever any client reports in with activity, the server performs the following as may be represented by the following pseudo-code:

```
handleClientActivity(client)
{
    if (client activity > 0) {
        // See if there are any messages we need to send to
        // this (possibly newly active) client.
        for each message in list_of_messages_sent {
            if (message was sent to this client) then {
                remove this message from
                list_of_messages_sent;
            } else {
                // this message was sent to another of our clients
                // but we're the first to report activity
                send message to this client;
                remove this message from list_of_messages_sent;
            }
        }
    }
}
```

Note that when a message is re-sent to another client, the client also tries to provide a rough indication of when the original message was sent. For example, if it takes a certain user two hours to get home from work and the user subsequently becomes active on their home PC, the server will provide a message like "[The following messages were originally sent to you a few hours ago]", followed by the messages that were sent to the user's work PC right after the user left.

Figure 7:
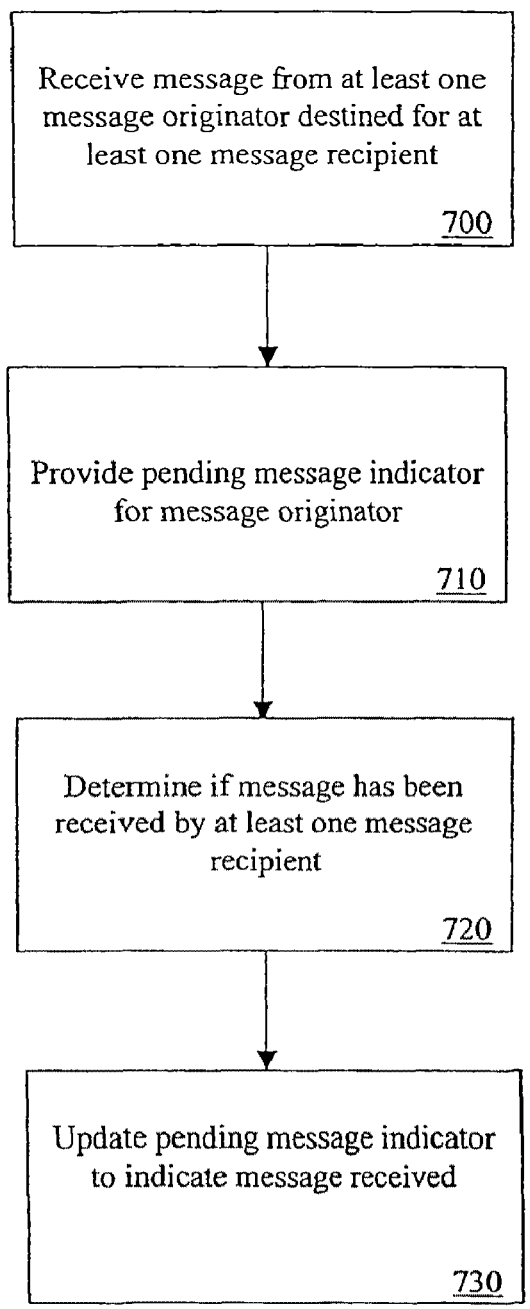
FIG. 7 is yet another exemplary method in accordance with the teachings of the present invention.

Referring to FIG. 7, one embodiment of the present invention is shown. In this embodiment, a message is received from at least one message originator destined for at least one message recipient, step 700. A pending message indicator is provided for the at least one message originator, step 710. It is determined if the message has been received by at least one message recipient, step 720, as may be determined in accordance with the descriptions above. The pending message indicator is updated to indicate message received, step 730. Updating the message indicator may be performed as described hereinabove, for example, by changing the message indicator from a first pending appearance, to a second received appearance as may be evidenced by a color or pattern change or other distinguishable appearance change.

An embodiment includes a computer readable medium having instructions stored thereon for executing the steps comprising creating a message listing of one or more pending messages, providing a message indicator in a first appearance for the one more pending messages, updating the message listing based on the receipt of message acknowledgements, and providing the message indicator in a second appearance for the one or more pending messages as the pending messages are deemed to be received. An embodiment also includes this computer readable medium where the first appearance and the second appearance correspond respectively to a first coloration and a second coloration of the message.

In the present embodiment, clients typically do not have continuous connections to the server, so it is impossible to know for certain when a client is offline. However, every client provides updates to the server every X number of seconds, where X is a number, such as in the range from zero to one hundred and twenty seconds. Such updates contain information about the client's status, and in return, the server sends back status information about each of the buddies or "bubs" for the client. In this embodiment, if a client does not send any updates for one minute, the server marks that client as offline.

In one situation, if a user is in a conversation with one or more other parties and the one or more other parties go offline, within a minute, the server will mark them as offline, and send a message to the user's client. The conversation window with the one or more parties will display a message "[{PARTY} is offline]". If the one or more parties later comes back online and the user has kept a conversation window with the one or more parties open, a new message will appear saying "[{PARTY} is back online]." Even if the user has closed that window, a status window displays when the one or more parties goes offline and indicates visually and with sound when they come back online.

To help the user know if they are connected from a personal digital assistant device or any other device, a visual indicator is provided of whether the user is connected. For example, there is an icon that appears on all screens of the interface that has two states: Connected and Connecting. If, for example, a user is not connected but is are running the system, the system will continue to try to connect. Since the client is sending a message to the server every X number of seconds, any time the client does not receive its return message from the server, the "Connected" icon changes to "Connecting," to indicate that there may be a problem with the connection. If it receives the return message after the next update, the icon returns to connected. If not, it stays "Connecting."

The following is an explanation of what happens if an exemplary user is in a conversation with someone and the user loses connectivity. First, each time the user sends a message, the message will appear in the "pending" style. After X number of seconds, the user's icon will change to Connecting rather than Connected. The user will also receive no new incoming messages. If the icon stays Connecting for a while and the user receives no confirmations of the user's messages, the user can conclude that the connection is bad. If, however, the other person or parties has lost connectivity while the user are still connected, then the pattern will be different. The user's messages will appear in the "pending" style and the user won't get incoming messages but the user's icon will show the user as Connected. After a minute, a message will appear in the conversation window saying that the other person or parties has gone offline. If the other party or parties reconnects before that minute is up, then the user would see the user's "pending message" switch to received and new incoming messages would arrive, since the other party's client would be trying to resend them.

It will be apparent to those skilled in the art that many changes and substitutions can be made to the systems and methods described herein without departing from the spirit and scope of the invention as defined by the appended claims.

We claim:

1. A method comprising:
   receiving, at a computing device, a connection status of a buddy associated with a user, the connection status including a device identifier identifying a first device used by the buddy; and
   playing a sound identifier to the user based on a change in the connection status of the buddy, wherein the sound identifier played is associated with the first device.

2. The method of claim 1, wherein the sound identifier uniquely identifies the connection status.

3. The method of claim 1, further comprising sending one or more pending messages to the device based on the connection status.

4. The method of claim 1, further comprising sending one or more pending messages to a second device in response to not receiving acknowledgement of receipt of the one or more pending messages from the buddy, and receiving further connection status indicating the second device is being used by the buddy.

5. The method of claim 1, further comprising sending one or more pending messages to the buddy based on the connection status.

6. The method of claim 5, further comprising receiving acknowledgement of receipt of the one or more pending messages from the buddy.

7. The method of claim 1, wherein the sound identifier uniquely identifies the buddy.

8. The method of claim 7, wherein the sound identifier is created by the buddy.

9. The method of claim 1, further comprising changing the connection status based on inactivity during a predetermined amount of time.

10. A system comprising:
    means for receiving a connection status of a buddy associated with a user, the connection status including a device identifier identifying a first device used by the buddy; and
    means for playing a sound identifier to the user based on a change in the connection status of the buddy, wherein the sound identifier played is associated with the first device.

11. The system of claim 10, wherein the sound identifier uniquely identifies the connection status.

12. The system of claim 10, further comprising means for sending one or more pending messages to the device based on the connection status.

13. The system of claim 10, further comprising means for sending one or more pending messages to a second device in response to not receiving acknowledgement of receipt of the one or more pending messages from the buddy, and receiving a further connection status indicating the second device is being used by the buddy.

14. The system of claim 10, further comprising means for sending one or more pending messages to the buddy based on the connection status.

15. The system of claim 14, further comprising means for receiving acknowledgement of receipt of the one or more pending messages from the buddy.

16. The system of claim 10, wherein the sound identifier uniquely identifies the buddy.

17. The system of claim 10, further comprising means for changing the connection status based on inactivity during a predetermined amount of time.

* * * * *